Figure 1:
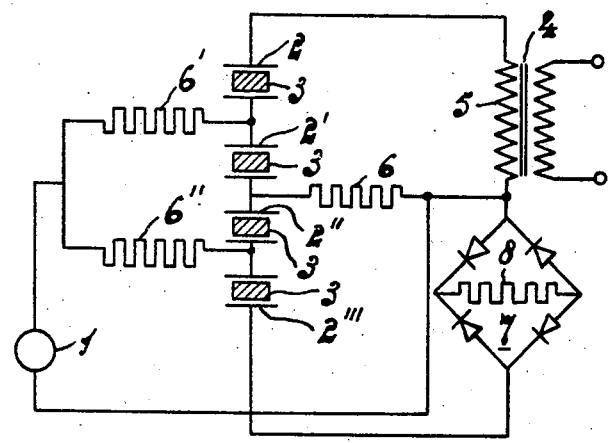

May 24, 1949.  G. HEPP  2,470,893
CIRCUIT ARRANGEMENT FOR MODULATING
AN ELECTRIC SIGNAL
Filed May 3, 1947  2 Sheets-Sheet 1

G. HEPP
INVENTOR

BY Fred M. Vogel
AGENT

May 24, 1949.  G. HEPP  2,470,893
CIRCUIT ARRANGEMENT FOR MODULATING
AN ELECTRIC SIGNAL
Filed May 3, 1947  2 Sheets-Sheet 2
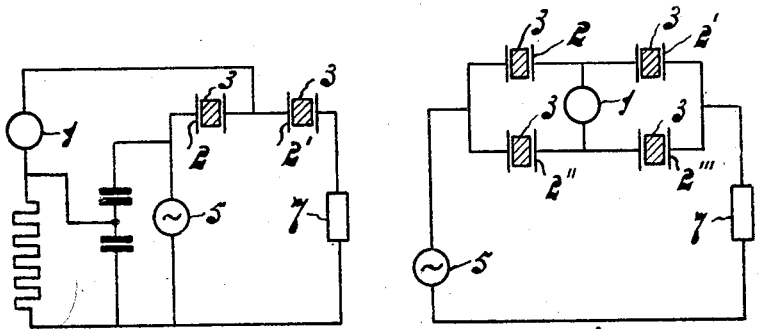
Fig. 5.  Fig. 6.
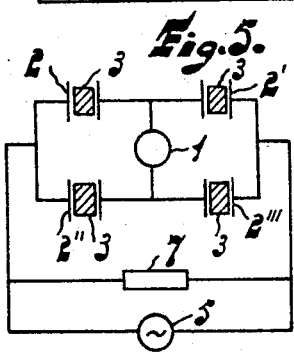 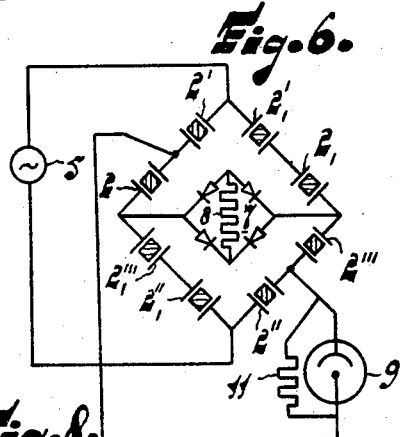
Fig. 7.  Fig. 8.
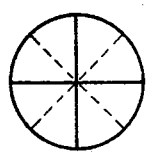 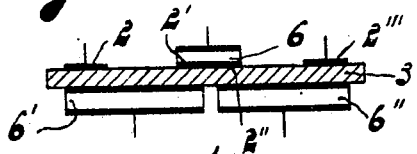
Fig. 9.  Fig. 10.
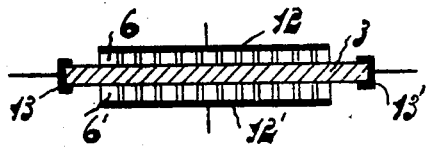 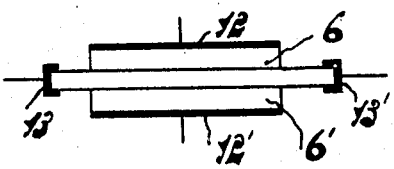
Fig. 11.  Fig. 12.
G. HEPP
INVENTOR
BY Fred M. Vogel
AGENT Patented May 24, 1949

2,470,893

UNITED STATES PATENT OFFICE 2,470,893

CIRCUIT ARRANGEMENT FOR MODULATING AN ELECTRIC SIGNAL

Gerard Hepp, Eindhoven, Netherlands, assignor to Hartford National Bank and Trust Company, Hartford, Conn., as trustee Application May 3, 1947, Serial No. 745,878
In the Netherlands March 27, 1946

Section 1, Public Law 690, August 8, 1946
Patent expires March 27, 1966

8 Claims. (Cl. 179—171)

The invention relates to a circuit-arrangement for modulating an electrical signal by applying this signal together with an auxiliary oscillation to an electrical circuit which comprises a condenser having a dielectric, the properties of which depend on the voltage across the condenser and/or on the current which is passed through the condenser, and, more particularly, to a circuit-arrangement for amplifying the signal, the amplified signal being derived by demodulation from one of the modulated oscillations occurring in the circuit, preferably from the modulated auxiliary oscillation.

It has been found that often this circuit-arrangement gives unsatisfactory results, if the signal source has a high impedance for alternating current.

According to the invention it has been found in addition that the said amplifying circuit-arrangement does not enable voltage amplification to be secured to an appreciable extent so long as transformers are not used.

The object of the invention is to provide a circuit-arrangement which gives satisfactory results even if use is made of a signal source having a high impedance for alternating current in general and for alternating currents of the frequency of the auxiliary oscillation in particular. In addition, the invention provides a means of increasing the voltage amplification of the amplifying circuit-arrangement.

According to the invention, at least two of the said condensers are included in the circuit, each of which having set up across it both a signal voltage and a voltage of the auxiliary oscillation, one of the voltages being applied in series connection, the other in parallel connection to these condensers.

If a very high signal voltage is available, or if the auxiliary voltage source is adapted to supply only a low voltage, the circuit-arrangement may be such that the auxiliary voltage is fed in parallel connection and the signal voltage in series connection to the condensers, it being sometimes desirable to connect leak resistances in parallel with the condensers.

The auxiliary voltage is, however, preferably supplied to the condensers in series connection and the signal voltage in parallel connection.

In this case, the signal voltage may be applied to the condensers through resistances, coils or through parallel oscillatory circuits tuned to the auxiliary oscillation, use being preferably made for this purpose of high-ohmic resistances.

These means may be dispensed with, if use is made of a signal source which, at least for alternating currents of the frequency of the auxiliary oscillation, has a high impedance, such, for example, as a photo-electric cell.

Figures 2, 3:
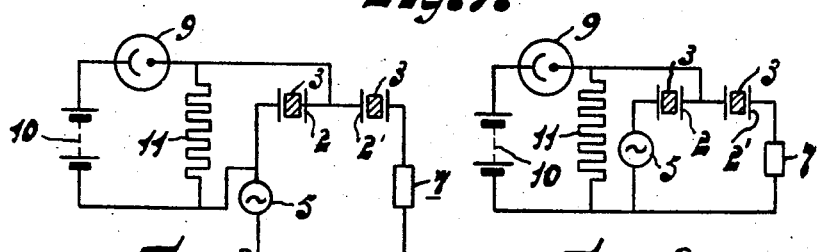
Figure 4:
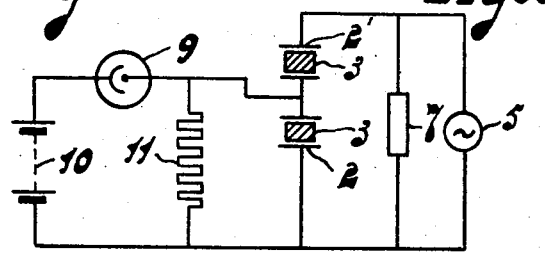

In order that the invention may be more clearly understood and readily carried into effect, it will now be explained more fully with reference to the accompanying drawing in which Figure 1 is a schematic diagram showing one form of circuit arrangement in accordance with the invention, Figure 2 is a schematic diagram of a circuit arrangement according to another embodiment of the invention, Figure 3 is a schematic diagram illustrating a further embodiment of the invention, Figure 4 is a schematic diagram illustrating still another circuit arrangement according to the invention, Figure 5 is a schematic diagram illustrating a further form of circuit arrangement in accordance with the invention, Figure 6 is a schematic diagram illustrating another form of circuit arrangement in accordance with the invention, Figure 7 is a schematic diagram illustrating a further form of circuit arrangement in accordance with the invention, Figure 8 is a schematic diagram illustrating still another form of circuit arrangement in accordance with the invention, Figure 9 illustrates one construction for the condensers for the circuits of the invention, Figure 10 illustrates another form of condenser construction, Figure 11 illustrates a further form of construction of the condenser, and Figure 12 illustrates a still another form of construction of the condensers.

Referring to Fig. 1, there is shown an amplifier according to the invention having a source 1 which supplies the signal required to be amplified for example, a low-frequency signal or a direct-current voltage. It is generally desirable that the signal should have the nature of a direct current voltage. It may be constituted by the superposition of an alternating voltage and a direct current voltage, so that the combined signal always has the same polarity.

According to the invention, a plurality of condensers 2, 2', 2'', 2''', each of them having a dielectric 3, are included in series in a circuit which in addition comprises the secondary winding 5 of a transformer 4 and a bridge circuit 7. The bridge circuit 7 is known in practice as a Grätz arrangement and comprises four rectifiers and a resistance 8.

An alternating voltage is applied to the primary winding of transformer 4, so that there is induced in the aforesaid circuit, through the secondary winding 5, and alternating voltage which is effective therein as an auxiliary oscillation.

The dielectric 3 is constituted by a substance, the properties of which depend on the voltage set up across the condenser 2 and/or on the current which is passed through the condenser, for example, Seignette salt or a substance primarily constituted by a representative of the ternary system $BaTiO_3$-$SrTiO_3$$PbTiO_3$. With the use of the latter substance, it is not essential that all three of the components of the ternary system should be present at a time. Very satisfactory results are obtained by means of dielectrics primarily constituted by $BaTiO_3$ or by representatives of the binary system $BaTiO_3$-$SrTiO_3$, for example, $BaTiO_3$ associated with not more than 35 mol.% of $SrTiO_3$. If the circuit-arrangement is used at room temperature, it is advisable to choose the percentage of $SrTiO_3$ between 15 and 30.

The various binary and ternary mixed products form homogeneous mixed crystals which, similar to the composing elementary bodies, exhibit a perowskite structure.

As an alternative, the condensers having a voltage-dependent capacity value may be constituted by blocking-layer rectifiers.

It is not necessary that all of the properties of the dielectric are voltage- and/or current-dependent; this dependence is exhibited as a rule by the dielectric constant, frequently by the loss angle and sometimes by both.

Also according to the invention, the signal voltage from the source 1 is supplied through high-ohmic resistances 6, 6', 6'', connected in parallel with the condensers 2, 2', 2'', 2''' whereas the auxiliary oscillation is fed in series connection to the condensers.

The circuit-arrangement operates as follows: Across each of the condensers there is set up a signal voltage and a voltage of the auxiliary oscillation. Due to the non-linear properties of the condensers, amplitude-modulation, among other things, the auxiliary oscillation is effected by the signal. According to the invention, the bridge circuit 7 enables the amplified signal to be derived from the modulated auxiliary oscillation by demodulation (in this case rectification); the amplified signal is set up across the resistance 8.

It is now found that the voltage set up across resistance 8 in the circuit-arrangement described is approximately four times as high as the voltages which would be obtained if only a single condenser were used. This method consequently permits of obtaining a material voltage amplification.

In a circuit-arrangement comprising more than two condensers it is not always necessary to supply all of the condensers in series connection with the auxiliary oscillation and neither is it necessary to supply the signal voltage in parallel connection to each of the condensers. Thus, for example, further circuit-arrangements will be described hereinafter, in which the auxiliary oscillation is supplied to a plurality of parallel branches, of which at least one is constituted by two or more series-connected condensers. In addition, reference will be made to circuit-arrangements in which the signal voltage is supplied to a plurality of parallel-connected branches, each of which is constituted, for example, by two series-connected condensers.

The circuit-arrangement according to the invention may be used with advantage in those cases in which the signal source has a high impedance for alternating currents, particularly for alternating currents of the frequency of the auxiliary oscillation, for example, a signal source comprising a photo-electric cell. The capacity of such a photoelectric cell is comparatively low, so that it constitutes a high impedance for the auxiliary oscillation.

To alleviate this condition a condenser could be connected in parallel with the signal source. For this purpose use will generally be made of a condenser having a comparatively high capacity, since the impedance of the entire electrical circuit must be materially lower than the impedance of the condenser having the voltage-dependent dielectric, otherwise the capacity variations of this condenser brought about by the signal voltage exercise little influence on the alternating current. The voltage-dependent condenser will preferably be given a maximum capacity in order to ensure a maximum energy at a minimum frequency of the auxiliary oscillation. If, however, the said condensers have a high capacity value, the time constant of the circuit-arrangement for the signal voltage becomes excessive and the circuit-arrangement is no longer adapted to follow the variations of the signal voltage. Hence the time constant of the circuit-arrangement puts a limit to the maximum permissible capacity that may be connected in parallel with the photo-electric cell.

When using a circuit-arrangement which comprises only one voltage-dependent condenser, a large part of the permissible capacity is thus required for the condenser to be connected in parallel with the photo-electric cell and this is consequently at the expense of the gain obtainable with the circuit-arrangement. This disadvantage can be obviated by the use of the circuit-arrangement according to the invention.

Figs. 2, 3 and 4 show simple circuit-arrangements, by means of which the foregoing disadvantage is obviated. In each figure the signal source is constituted by a photo-electric cell 9, an associated direct current source 10 and a load resistance 11. The signal voltage supplied by the photo-electric cell is set up across the high-ohmic resistance 11 and is supplied in parallel to the two condensers 2 and 2'. An auxiliary voltage source 5 and a demodulator 7 are diagrammatically represented. As regards the circuit-arrangement shown in Fig. 3 it may be observed in addition that it exhibits the advantage that the battery can be grounded. The circuit-arrangement shown in Fig. 4 is used preferably if the auxiliary voltage source 5 supplies a constant current, and hence has a very high impedance.

In the circuit-arrangements outlined the fact that the photo-electric cell has a high impedance for alternating current is of no importance and moreover, a voltage amplification is obtained which is twice as great as that obtainable with a single condenser and a signal source of low impedance. These circuit-arrangements operate in a manner analogous to that shown in Fig. 1. Other arrangements providing minor circuit advantages should be obvious to those skilled in the art.

If alternating voltages cannot be tolerated across the signal source, one of the circuit-arrangements shown in Figs. 5, 6 and 7 may be employed. In these circuit-arrangements the signal source is included in one of the diagonal arms of a bridge circuit, whereas the other diagonal arm comprises the auxiliary voltage source. From the well-known factors concerning electrical bridges, it should be obvious that this connection results in the signal source 1 having no current from the alternating current supply 5 passed through it, and the impedance of this source for alternating current is therefore no longer of any consequence. The circuit-arrangement of Fig. 7 is used particularly if the auxiliary voltage source supplies a constant current and hence has a very high impedance.

As a matter of course, in order to achieve the above-mentioned object a blocking network, for example a resistance, an inductance or a parallel oscillatory circuit tuned to the frequency of the auxiliary oscillation may be used between the voltage-dependent condensers rather than a bridge circuit.

Fig. 8 shows a circuit-arrangement comprising a photo-electric cell, in which the auxiliary voltage source 5 and the demodulator 7 are each included in a diagonal arm of a bridge circuit, the other arms of the bridge circuit being formed each by a pair of series-connected condensers 2, 2' and so forth. Each of these condensers has a voltage- and/or current-dependent dielectric. The photo-electric cell is connected, on the one hand, between the condensers 2, 2' and, on the other hand, between 2'', 2'''. It is advisable to arrange a resistance 11 in parallel with the photo-electric cell. A unidirectional voltage source for the photo-electric cell can be dispensed with, since a voltage from the auxiliary voltage source 5 is set up across the photo-electric cell, which as a rule suffices to cause the photo-electric cell to operate. If desired, the rectified auxiliary voltage may be used as a unidirectional voltage for the photo-electric cell.

The pairs of condensers 2, 2', 2'', 2''' might be constructed as normal condensers and, moreover, be replaced pairwise by one condenser. The embodiment above described, however, ensures a circuit-arrangement which is automatically corrected for temperature variations.

The eight condensers may be arranged on a single plate of dielectric in the manner indicated in Fig. 9. The upper and the lower sides of this plate are both coated with a conductive layer; each of these layers is provided with two slits which are normal to one another and the slits of each side of the plate are shifted relatively to one another by 45°. Thus both the top side and the bottom side have formed on them four electrodes which together constitute the eight condensers.

Fig. 10 shows a practical embodiment of the condensers which could be used in the circuit-arrangement of Fig. 1, the resistances 6, 6' and 6'', 6''' being formed by poorly conducting or semi-conductive substances, which either directly or, as illustrated in the figure, via intermediate conductive layers, are in contact with the dielectric. The conductive layers are denoted in the figure by thick black dashes. If a large number of voltage-dependent condensers are used in the same circuit-arrangement, the construction shown in Fig. 10 provides a material simplification of the circuit-arrangement.

If the width of the conductive layers is of the order of magnitude of the thickness of the dielectric, these layers may also be dispensed with. This leads to a construction as shown in Fig. 11, the semi-conductive or poorly conducting substances 6, 6' and so forth being spaced away from each other and supporting two electrodes 12 and 12' which make contact with them on the upper side and on the lower side respectively of the dielectric. Two electrodes 13 and 13' are directly secured to the dielectric at its two ends. The signal source is connected to the electrodes 12, 12' the auxiliary voltage source to the electrodes 13, 13'.

It is even possible to go a step farther, and fill the spaces intermediate the poorly conducting or semi-conductive layers with the same substance, so that the traverse slits in the semi-conductor have disappeared. This leads to the device shown in Fig. 12.

The circuit-arrangement shown in Figs. 2, 3 or 4 may be further improved by housing the condensers 2, 2' directly in the photo-electric cell and by passing to the outside only the connections to the external coatings of the condensers 2 and 2'.

The value of the resistance 11 is limited by the leak resistance existing in parallel therewith and representing the leakage across the input terminals of the photo-electric cell. As a rule this is not constant and is affected, for example, by moisture. If the condensers are housed within the bulb, the variable leakage across the supply terminals is no longer of importance.

Under certain conditions, the resistance 11 may be dispensed with, it being then as it were replaced by the leak resistance of and along the condensers 2 and 2'. The condensers being contained within the bulb of the photo-electric cell, this leak resistance has a sufficiently constant value. For reproducing quick variations in the signal voltage one or more leak resistances may be required to be provided across the condensers, preferably also within the bulb of the photo-electric cell. The introduction of condensers having a voltage- and/or current-dependent dielectric may be advantageous not only for photo-electric cells, but also for pH-meters, ionisation-chambers and more generally for discharge tubes.

In a compensation circuit-arrangement the compensation condensers are also preferably housed within the bulb.

The circuit-arrangements described are not only suitable for amplifying low-frequency signals and unidirectional voltages, but also for amplifying signals caused to modulate a carrier wave and may also be used, for example, in radio receivers.

When amplifying low-frequency oscillations the frequency of the auxiliary oscillation must exceed, and preferably be high compared with the highest frequency of the oscillations to be amplified.

It is sometimes advisable to include in the circuit one or more oscillatory circuits which are tuned to the frequency of the auxiliary oscillation or to the difference-frequency of the auxiliary oscillation and the signal to be amplified. The amplified signal may be derived by demodulation from the modulated oscillations set up across these circuits, if necessary after further amplification.

What I claim is:

1. A circuit arrangement for amplifying a signal voltage, comprising a circuit having first and second capacitors having dielectric properties which vary in accordance with the potential existing thereacross, means to apply an auxiliary voltage to said capacitors in series, means comprising a high resistance element to apply said signal voltage to said capacitors in parallel to modulate said auxiliary voltage, and means to demodulate said modulated auxiliary voltage to derive a potential proportional to said signal voltage.

2. A circuit arrangement for amplifying a signal voltage, comprising a circuit having first and second capacitors having dielectric properties which vary in accordance with the potential existing thereacross, means to apply an auxiliary voltage to said capacitors in series, means comprising a parallel resonant circuit tuned to the frequency of said signal voltage to apply said signal voltage to said capacitors in parallel to modulate said auxiliary voltage, and means to demodulate said modulated auxiliary voltage to derive a potential proportional to said signal voltage.

3. A circuit arrangement for amplifying a signal voltage obtained from a source of said signals, comprising a circuit having first and second capacitors having dielectric properties which vary in accordance with the potential existing thereacross, means to apply an auxiliary voltage to said capacitors in series, said source of said signals having a high impedance at the frequency of said auxiliary voltage, means comprising a parallel resonant circuit tuned to the frequency of said signal voltage to apply said signal voltage to said capacitors in parallel to modulate said auxiliary voltage, and means to demodulate said modulated auxilairy voltage to derive a potential proportional to said signal voltage.

4. Apparatus comprising a plurality of capacitors having dielectric properties which vary in accordance with the potential existing thereacross, comprising a single coherent dielectric body, an electrode, a semi-conducting member interposed between said body and said electrode, and a plurality of further electrodes in direct contact with said dielectric body.

5. Apparatus comprising a plurality of capacitors having dielectric properties which vary in accordance with the potential existing thereacross, comprising a single coherent dielectric body, a plurality of electrodes, a plurality of semi-conducting members interposed between said body and said electrodes, and a plurality of further electrodes in direct contact with said dielectric body on opposing sides thereof, the junction line between said electrodes being substantially normal to the junction line between said further electrodes.

6. A circuit arrangement for amplifying a signal voltage produced by an electron discharge system, comprising an electron discharge tube having an envelope and an electrode on which said signal voltage appears, a circuit having first and second capacitors having dielectric properties which vary in accordance with the potential existing thereacross, said first and second capacitors being arranged within said envelope in contact with said electrode to apply said signal voltage to said capacitors in parallel, means to apply an auxiliary voltage to said capacitors in series thereby to modulate said auxiliary voltage by said signal voltage, means to demodulate said modulated auxiliary voltage to derive a potential proportional to said signal voltage, and means sealed in said envelope and coupled to one of said capacitors to form a lead-through conductor to said electrode.

7. A circuit arrangement for amplifying a signal voltage produced by an electron discharge system, comprising an electron discharge tube having an envelope and an electrode on which said signal voltage is developed, a circuit having first and second capacitors having dielectric properties which vary in accordance with the potential existing thereacross and having first and second coatings arranged on either side of said dielectric, said first and second capacitors being arranged within said envelope and said first coating being in contact with said electrode to apply said signal voltage to said capacitors in parallel, means to apply an auxiliary voltage to said capacitors in series thereby to modulate said auxiliary voltage by said signal voltage, means to demodulate said modulated auxiliary voltage to derive a potential proportional to said signal voltage, and electrical lead-through conductors sealed in said envelope and connected to said second coating.

8. A circuit arrangement for amplifying a signal voltage produced by a photoelectric discharge system, comprising an electron discharge tube having an envelope, a photoelectric cathode and an anode, a circuit having first and second capacitors having dielectric properties which vary in accordance with the potential existing thereacross, said first and second capacitors being arranged within said envelope and being coupled to said anode to apply said signal voltage to said capacitors in parallel, means to apply an auxiliary voltage to said capacitors in series thereby to modulate said auxiliary voltage by said signal voltage, and means to demodulate said modulated auxiliary voltage to derive a potential proportional to said signal voltage.

GERARD HEPP.

REFERENCES CITED

The following references are of record in the file of this patent:

UNITED STATES PATENTS

| Number | Name | Date |
| --- | --- | --- |
| 1,884,591 | Davis | Oct. 25, 1932 |
| 2,182,377 | Guanella | Dec. 5, 1939 |
| 2,220,098 | Guanella | Nov. 5, 1940 |
| 2,243,921 | Rust et al. | June 3, 1941 |
| 2,298,466 | Covley | Oct. 13, 1942 |

FOREIGN PATENTS

| Number | Country | Date |
| --- | --- | --- |
| 522,132 | Great Britain | June 10, 1940 |